(12) United States Patent
Fijol

(10) Patent No.: US 6,867,837 B2
(45) Date of Patent: Mar. 15, 2005

(54) LIQUID CRYSTAL DEVICE AND MANUFACTURING METHOD

(75) Inventor: John Fijol, Shrewsbury, MA (US)

(73) Assignee: Raytheon Company, Waltham, MA (US)

( * ) Notice: Subject to any disclaimer, the term of this patent is extended or adjusted under 35 U.S.C. 154(b) by 451 days.

(21) Appl. No.: 09/769,166

(22) Filed: Jan. 23, 2001

(65) Prior Publication Data

US 2002/0135721 A1 Sep. 26, 2002

(51) Int. Cl.$^7$ .................. G02F 1/1337; G02F 1/141
(52) U.S. Cl. ................ 349/132; 349/123; 349/134
(58) Field of Search .................. 349/123–135

(56) References Cited

U.S. PATENT DOCUMENTS

| | | | |
|---|---|---|---|
| 4,153,529 A | 5/1979 | Little et al. | |
| 5,350,498 A | 9/1994 | Smith, Jr. et al. | 204/192.15 |
| 5,512,148 A | 4/1996 | Smith, Jr. et al. | 427/108 |

FOREIGN PATENT DOCUMENTS

JP        56 019030 A        2/1981

OTHER PUBLICATIONS

John L. Janning; "Thin Film Surface Orientation For Liquid Crystals"; Appl. Phys. Lett., vol. 21, No. 4, Aug. 15, 1972; pp. 273–174.
Leon Abelmann et al.; "Oblique Evaporation And Surface Diffusion"; Elsevier Science S.A.; 1997; pp. 1–21.
E. Guyon et al.; "On Different Boundary Conditions Of Nematic Films Deposited On Obliquely Evaporated Plates"; Laboratoire de Physique des Solides, Universite Paris–Sud, 9105 Orsay; Letters In Applied And Engineering Sciences, vol. 1; 1973; pp. 19–24.
Lawrence A. Goodman et al.; "Topography of Obliquely Evaporated Silicon Oxide Films and Its Effect on Liquid–Crystal Orientation"; IEEE Transactions On Electron Devices; vol. ED–24, No. 7; Jul., 1997; pp. 795–804.
Milo R. Johnson et al.; "Low–Tilt–Angle Nematic Alignment Compatible With Fit Sealing"; IEEE Transactions On Electron Devices; vol. ED–24, No. 7; Jul., 1977; pp. 805–808.
Dietrich Meyerhofer; "New Technique of Aligning Liquid Crystals on Surfaces"; Applied Physics Letters, vol. 29, No. 11; Dec. 1, 1976; pp. 691–692.
Hiroshima, "Controlled Low Tilt Angle Liquid Crystal Orientation", Proceedings of the Society for Information Display, 1984 pp. 287–292, XP002227958, ISBN: 0–8186–0872–2, New York NY.
Sun, Z. M. et al, "Ar$^+$ Beam Sputtering on Solid Surfaces and nematic Liquid Crystal Orientation" Journal de Physique II, Jan. 1994, pp. 59–73, vol. 4, no. 1, XP008011663, ISSN: 1155–4312, France.

*Primary Examiner*—Dung T. Nguyen
(74) *Attorney, Agent, or Firm*—Daly, Crowley, Mofford & Durkee, LLP

(57) ABSTRACT

A liquid crystal cell having a first substrate with a plurality of parallel columns of director alignment material disposed on a surface of the first substrate. Each one of the columns has a longitudinal axis disposed at an oblique angle with respect the surface of the first substrate. Each one of the columns terminates in a distal end having a surface substantially flat and substantially parallel to the surface of the first substrate. A second substrate is provided. A liquid crystal material is disposed between the surfaces of the first and second substrates with portions of such liquid crystal material being in contact with the parallel columns of director alignment material. A method for forming a liquid crystal substrate structure is provided. The method includes providing a substrate in a chamber. A surface of the substrate is subjected to a deposition flux of director alignment material with such flux passing to the substrate surface along a first axis having an oblique angle with respect to a normal to the surface of the substrate while a beam of particles is directed to the surface of the substrate along a second axis, the second axis being at an obtuse angle with respect to the first axis to produce a director alignment layer. A liquid crystal material is deposited on the director alignment layer.

2 Claims, 6 Drawing Sheets

LIQUID CRYSTAL DEVICE AND MANUFACTURING METHOD

TECHNICAL FIELD

This invention relates to liquid crystal devices and manufacturing methods and more particularly to method for providing liquid crystal director alignment layers and devices having such liquid crystal director alignment layers.

BACKGROUND

As is known in the art, liquid crystal devices are used in wide range of applications, such as in displays, light valves, spatial light modulators, and optical phased arrays. One commonly used type of liquid crystal, nematics, have an elongated molecular structure, which results in an ordinary ($n_o$), and extraordinary ($n_e$) refractive index along the short and long axis of the molecules, respectively. The arrangement of the molecules is not random as in liquids, but instead the molecules align to one another in a preferred direction defined as a so-called director. Due to molecular dipoles (permanent or induced), the director can be rotated by applying an electric (or magnetic) field.

Referring to FIG. 1, a typical nematic liquid crystal device, or cell, 10 includes a thin layer 12 of liquid crystal which is encapsulated between two flat substrates 14a, 14b, with here both substrates 14a, 14b having conducting films 16a, 16b, (electrodes) respectively, and at least one of the electrodes 16a, 16b being optically transparent. Electromagnetic radiation with a polarization angle parallel to the liquid crystal molecules plane of rotation represented by arrow 18 entering the liquid crystal cell 10 sees a varying refractive index as the director is rotated by applying an electric field passing through the layer 12 of liquid crystal because of a voltage applied to the electrodes 16a, 16b. Thus, the exiting radiation, indicated by the arrow 18', will have a varying transit time through the cell, which is dependant upon the orientation of the liquid crystal director. In short, the cell imposes a tunable phase delay in accordance with the voltage between the electrodes 16a, 16b. This tunable phase delay can be utilized to construct devices such as phase retarders, special light modulators and optical phased arrays.

However, proper operation of the cell 10 requires that the liquid crystal's director relax to a known, repeatable, well-defined orientation in the absence of an applied field. The resting orientation of a liquid crystal's director is controlled in both azimuth and elevation by surface treatments or interfacial layers, sometimes referred to as director alignment layers, applied to the inner surfaces of the substrates 14a, 14b. These surface treatments/layers, or director alignment layers, shown in FIG. 1 as alignment layers 17 and can cause parallel (homogeneous) or perpendicular (homeotropic) alignment between the director and substrate. In the thin cell devices above, electric fields are applied across the gap between the substrates, causing the directors to rotate such as to be normal to the substrates. Therefore, in a resting state, the alignment layers should force the director into a homogeneous alignment to maximize the dynamic range of the device. To avoid the formation of disclinations (domain boundaries within the liquid crystal) alignment layers are designed to produce a slight elevation of the quiescent directors. This elevation angle, referred to as a tilt bias angle, is typically several degrees with respect to the substrate surface, and constrains the directors to a single rotational direction in response to the electric field.

The most common alignment technique is the use of a polymer film (typically a polyimide) which is rubbed by an organic fiber cloth. Alignment can routinely be obtained parallel to the rubbing direction with a tilt bias of several degrees. However, the use of polymer films, which are sensitive to mechanical, chemical, and thermal degradation, imposes significant processing limitation on device fabrication. Once the polymer films have been applied, the maximum processing temperature must remain low (<300 degrees C.), restricting the use of processes such as glass frit sealing and flip-chip solder bonding. In addition, the substrates cannot be solvent cleaned to remove contaminants prior to assembly. Finished devices are also restricted from use at elevated temperatures, such as high power laser, applications which can cause localized heating.

Obliquely deposited inorganic films, such as silicon monoxide SiO, have been developed which are an alternative to rubbed polymer alignment layer. Here the oblique angle between the SiO deposition flux and substrate normal is typically between 45 and 90 degrees. See Applied Physics Letters 21, 173 (1972), J. L. Janning. Early reports indicated modest control of the tilt bias (between 20 degrees and 30 degrees) by varying the angle between the substrate and SiO deposition flux (see Lett. Appl, Eng. Sci., 1, 19 (1973), E. Guyon, P. Pieranski and M. Boix) or by varying the SiO thickness (See Jpn J. Appl. Phy., 19, 5567 (1980) K. Hirosima and M. Mochizuki). The needs for lower tilt biases in higher performance devices have motivated further development of SiO alignment layers. Meyerhofer and Johnson et. al (Appl. Phys. Lett, 29, 691 (1967), IEEE Trans. Elect. Dev., ED-24, 805 (1977) demonstrated multi-layer SiO deposition techniques that yielded low lilt bias; however, the technique requires extremely thin (~5 Angstrom) layers that are difficult to reproduce in large area/high volume production. Recently, Smith et. al (see U.S. Pat. No. 5,512,148) demonstrated that ion beam sputter deposited SiO treated with alcohol will produce low tilt bias alignment; however, the use of organic thin films imposes the same problems as rubbed polymer films.

One apparatus used to provide the SiO deposition is shown in FIG. 2. Here, the substrate 14b is supported in a vacuum chamber such that the substrate normal 18 is at an angle here 85 degrees to the direction of a deposition flux (i.e., the evaporated species used to deposit the $SiO_x$ director alignment layer 17, FIG. 1), as indicated. The effect of such process is to "grow" columns 17 of $SiO_x$, as shown in FIG. 3. The directors are indicated by numerical designation 19 in FIG. 3. It is first noted that the columns 17 have a longitudinal axis 21 which is at an oblique angle, α, typically no smaller than 50 degrees with respect to the surface of the substrate 14b.

Referring also to FIG. 4, it is noted that the effect of the impacting deposition flux of $SiO_x$ is to form the distal end 20 of the column 17 of $SiO_x$, with a surface 22a, 22b, 22c that grows towards an oblique angle β (FIG. 3) with respect to the surface of the substrate 14b. It is first noted that the directors are substantially flat and aligned substantial parallel to the surface of the $SiO_x$ columns 17. It is next noted that the near director field (indicated by numerical designation 24a) is parallel to the directors 19. Thus, the near director field 24a is parallel to the longitudinal axis 21 of the column 17 in the region more proximate the surface of the substrate 14b; however, the far director field (indicated in FIG. 3 by numerical designation 24b) tends to deviate in angular direction towards surface 22 at the distal end of the column 17. Thus, the effective tilt angle of the cell is the angle γ. Typically, the effective director tilt angle γ is relatively high, e.g., in the order of 20 degrees, thereby reducing the dynamic range of the cell. It should be noted that the angle of the longitudinal axis 21 relative to the surface of the substrate, i.e, the angle α, is limited by the kinetics of the growing process used to form the columns and not by the angle between the deposition flux and the normal 18 to the surface of the substrate (FIG. 2)

SUMMARY

In accordance with the present invention, a liquid crystal cell is provided having a first substrate. A plurality of parallel columns of director alignment material is disposed on a surface of the first substrate. Each one of the columns has a longitudinal axis disposed at an oblique angle with respect the surface of the first substrate. Each one of the columns terminates in a distal end having a surface substantially flat and substantially parallel to the surface of the first substrate. A second substrate is provided. A liquid crystal material is disposed between the surfaces of the first and second substrates with portions of such liquid crystal material being in contact with the parallel columns of director alignment material.

With such an arrangement, the director far field is at a relatively low tilt angle thereby increasing the dynamic range of the cell.

In one embodiment of the invention, a liquid crystal substrate structure is provided. The structure includes a substrate and a plurality of parallel columns of director alignment material disposed on a surface of the substrate. Each one of the columns has a longitudinal axis disposed at an oblique angle with respect the surface of the substrate. Each one of the columns terminates in a distal end having a surface substantially flat and substantially parallel to the surface of the substrate.

In accordance with one embodiment, a method for forming a liquid crystal substrate structure is provided. The method includes providing a substrate in a chamber. A surface of the substrate is subjected to a deposition flux of director alignment material with such flux passing to the substrate surface along a first axis having an oblique angle with respect to a normal to the surface of the substrate while a beam of particles is directed at the same surface of the substrate along a second axis, the second axis being at an obtuse angle with respect to the first axis to produce a director alignment layer. The resulting director alignment layer is comprised of a plurality of columns of the director alignment material, which have a longitudinal axis lying in a direction generally equivalent to the first direction, but at an angle with respect to the substrate surface that has been substantially reduced by the directed beam of particles. Further, the director alignment layer is comprised of columns of director alignment material with distal ends that have substantially grater flatness and parallelism with respect to the substrate surface due to the directed beam of particles. A liquid crystal material is deposited on the director alignment layer.

In accordance with another embodiment, a method is provided for forming a liquid crystal cell. The method includes providing a liquid crystal cell substrate in a vacuum chamber having an electron beam evaporation source for producing a flux of director alignment material from the source along a first direction, a substrate holder, and an ion gun for directing ions towards the surface of the substrate along a direction opposite to the first direction. A substrate is affixed to the substrate holder with a normal to a surface of the affixed substrate disposed at an oblique angle with respect to the first direction. A plurality of columns of the director alignment material is produced, by activating the evaporation source of the director alignment material and the ion gun to produce the flux of director alignment material from the source along the first direction with the an ion gun for directing ions towards the surface of the substrate along the direction opposite to the first direction. The substrate with the columns of director alignment material is removed from the chamber. A liquid crystal material is placed on the produced director alignment layer.

In a preferred embodiment, the director alignment material is an inorganic material, preferably $SiO_x$.

With such method, a low tilt bias inorganic alignment layer is obtained using a robust, scalable, single deposition process. The unique director alignment layer surface morphology and composition are obtained using an ion beam assist during deposition. These surface modifications, facilitated by the ion beam assist, provide precision control of the pre tilt angle, and more specifically a repeatable, spatially uniform tilt bias which can be varied from 0° to >30°. The resulting alignment layers are thermally stable at high temperatures (>300° C.), are resistant to solvent cleaning, and have a high laser damage threshold (>1 joule/cm2, near IR, short pulse).

The details of one or more embodiments of the invention are set forth in the accompanying drawings and the description below. Other features, objects, and advantages of the invention will be apparent from the description and drawings, and from the claims.

DETAILED DESCRIPTION

Figure 2:
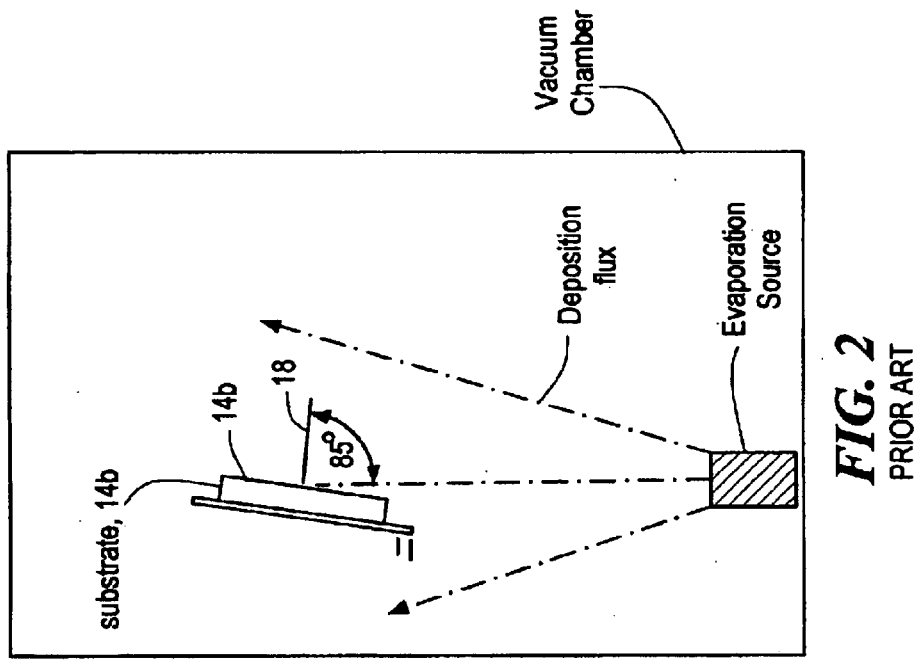
FIG. 2 is a schematic diagram of apparatus used to form a director alignment layer in the liquid crystal cell of FIG. 1 according to the PRIOR ART.
Figure 1:
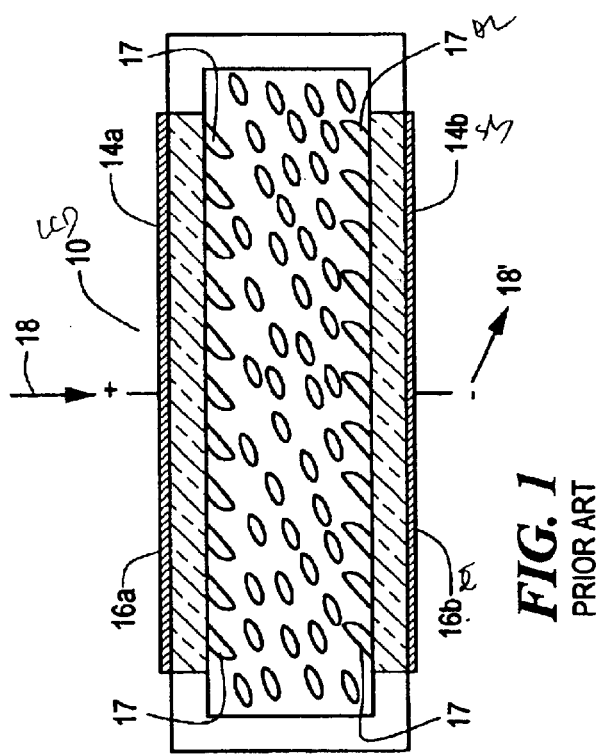
FIG. 1 is a diagrammatical sketch of a liquid crystal cell according to the PRIOR ART.
Figure 5:
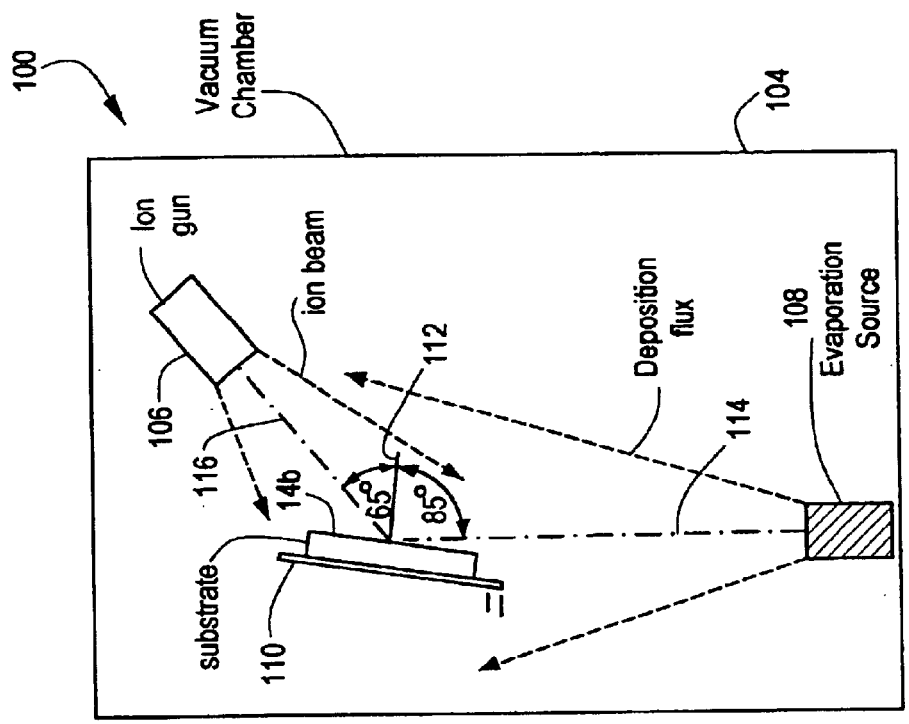
FIG. 5 is a schematic diagram of apparatus used to form a director alignment layer in the liquid crystal cell according to the invention.
Figure 6:
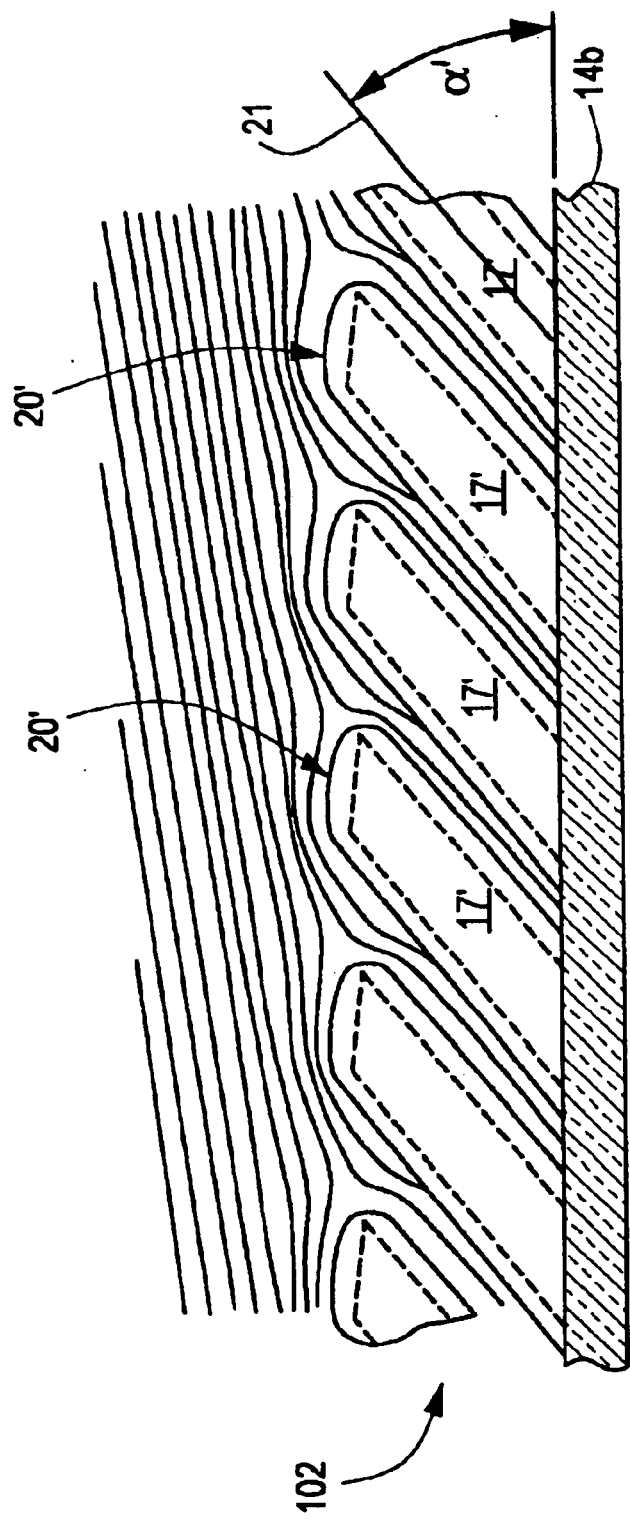
FIG. 6 is a sketch of a portion of a substrate structure of the cell formed with the apparatus of FIG. 5 according to the invention, such sketch showing columns of director alignment material on the substrate structure according to the invention.

Referring now to FIG. 5, apparatus 100 is shown for producing a director alignment layer 102 (FIG. 6). It is first noted that the apparatus 100 is identical to the apparatus shown in FIG. 1, except for the inclusion in the vacuum chamber 104 of an ion gun 106. Thus, here the substrate 14b, here for example glass placed in vacuum chamber 104 along with the ion gun 106 and an electron beam (E-beam) evaporation source 108. Here the source is an inorganic material, such as silicon monoxide (e.g. SiO). The substrate 14b is mounted on a substrate holder 110. The normal 112 to the upper exposed surface of the substrate 14b is at an angle, here −85 degrees with respect to the flux deposition axis 114 of the evaporation source 108 and at an angle 65 degrees with respect to ion flux axis 116, as shown in FIG. 5. It is important to note that the direction of the ions emitted by ion source 106 is opposite to the direction of the deposition flux. The ion gun is here located such that the ion beam is within the same plane of incidence of the SiO deposition flux, but it impinges on the substrate from the opposite direction as that of the deposition flux. Thus, as noted above, relative to the normal 18, the SiO flux is at an angle −85 degrees and the ion beam is at an angle +65 degrees, as shown in FIG. 5. Here, the ion gun 106 produces the flux of argon ions as noted above in connection with FIGS. 1 through 4, absent a beam of ions from the ion gun 106 the evaporation source would produce columns 17 of SiO on the substrate 14b as shown in FIG. 3. Here, however, the effect of the ions traveling in a direction opposite to the direction of the deposition flux produced by the evaporation source is to reduce the momentum of the SiO particles and thereby produce columns 17' (FIGS. 6 and 7) that have distal ends 20 with surfaces which are substantially flat and substantially parallel to the surface of the substrate 14b and also reduces the angle between the longitudinal axis 21' and the surface of the substrate, i.e., the angle $\alpha'$ as compared to the angle $\alpha$ shown and described above in connection with FIG. 3. Here, the angle $\alpha'$ is 36 degrees while, without the ion beam, the angle $\alpha'$ is 56 degrees.

Figure 9:
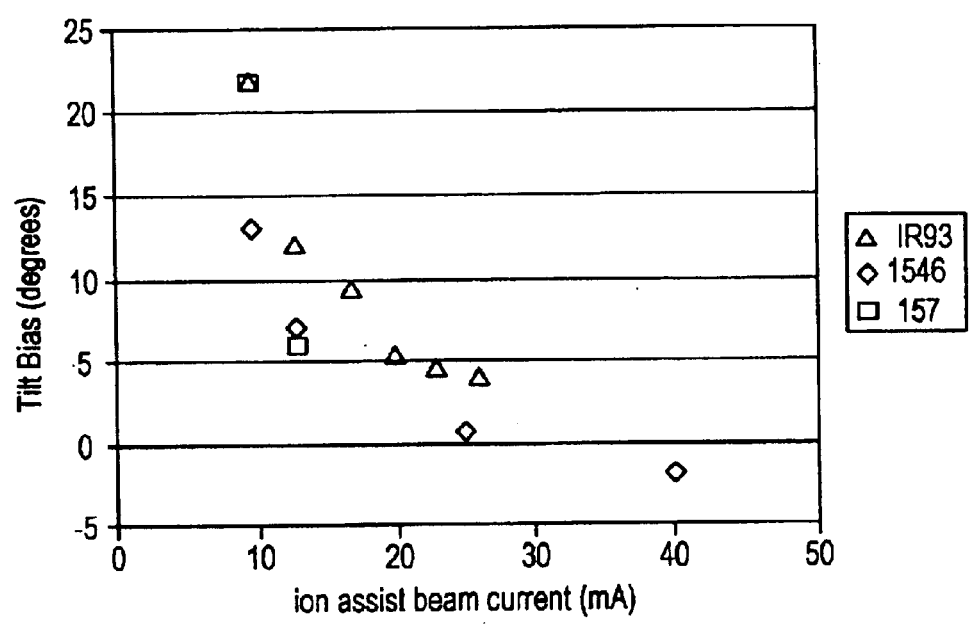
FIG. 9 shows a plot of liquid crystal tilt bias as a function of ion beam current for three nematic liquid crystals.

FIG. 9 shows a plot of liquid crystal tilt bias as a function of ion beam current for three nematic liquid crystals. The samples designated E7 and E46 are cyano-biphenyls and the sample designated IR93 is based on a mixture of diphenly-diacetylene (PTTP) compunds consisting of dialkyl (PTTP-nm) and diflouro (PTTF-nF) homologs. For the films used to generate the data in FIG. 9, the ion beam energy was fixed at 150 eV and the deposition rate was fixed at 2.0 Angstroms per second. As indicated, the use of an ion beam assist causes the columnar structure to tilt further from the sample normal, while planarizing the surface. It should be noted that increasing ion beam current (which leads to higher columnar angles and greater planarity) decreases tilt bias.

Figure 3:
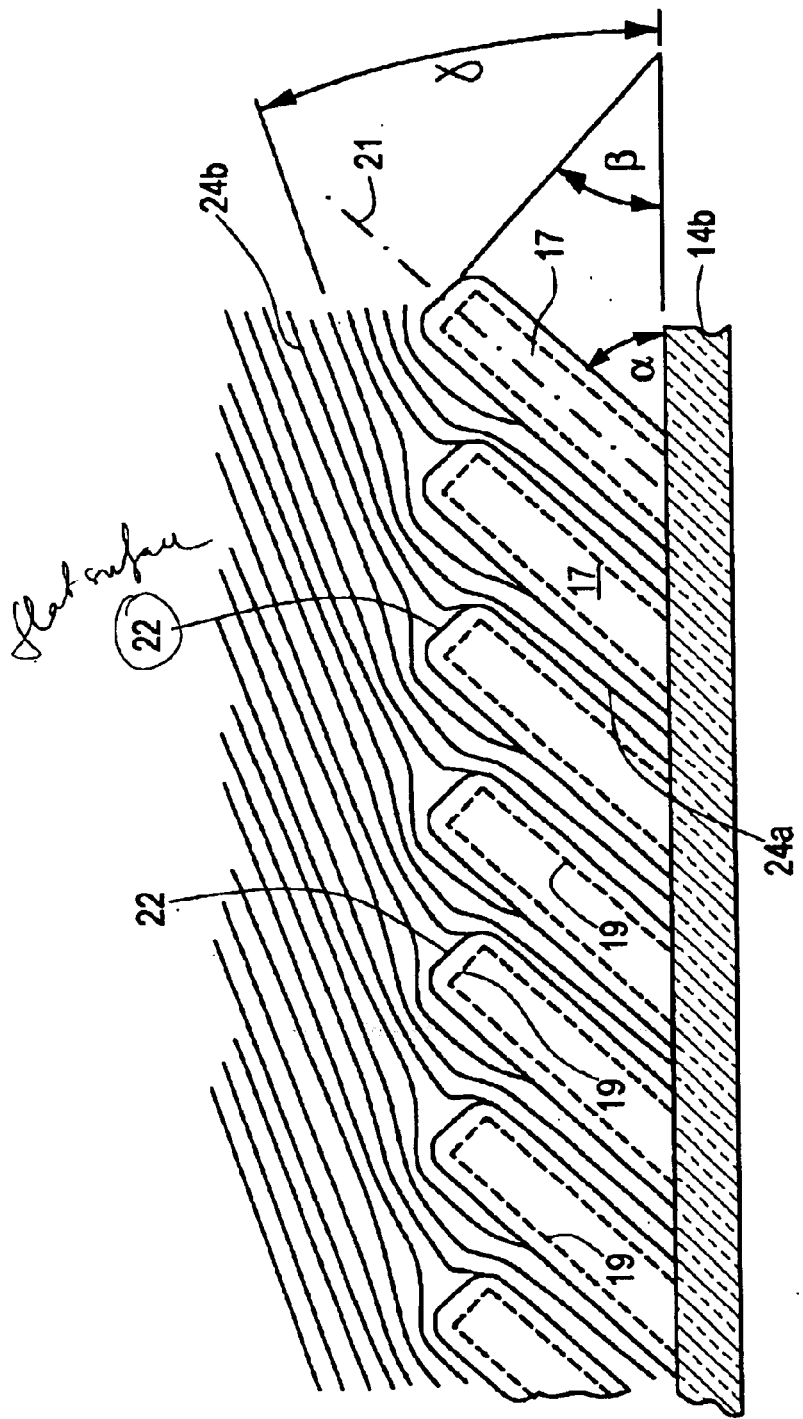
FIG. 3 is a sketch of a portion of a substrate structure of the cell of FIG. 1, such sketch showing columns of director alignment material on the substrate structure of FIG. 2 according to the PRIOR ART.
Figure 4:
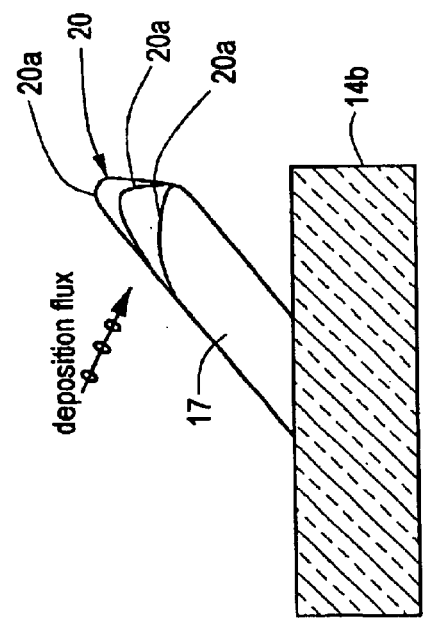
FIG. 4 is a sketch useful in understanding the effect of the apparatus in FIG. 2 of producing the director alignment layer of FIG. 3 in accordance with the PRIOR ART
Figure 7:
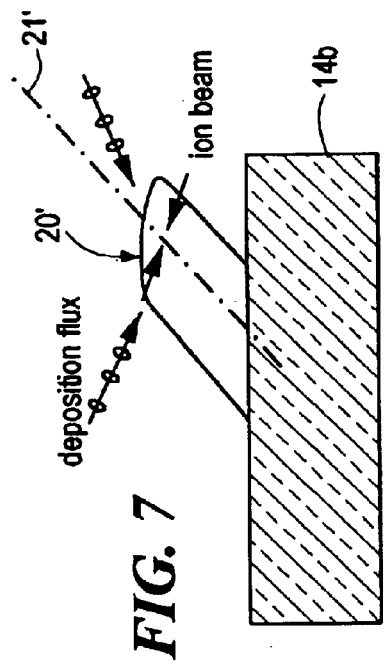
FIG. 7 is a sketch useful in understanding the effect of the apparatus in FIG. 5 of producing the director alignment layer of FIG. 6 in accordance with the invention

An important consideration is that the column tilt angle (relative to the substrate normal) obtained by oblique evaporation is typically less than the deposition flux angle. Several models have been presented to explain the difference between the incident beam and column angles, but the most credible is the conservation of parallel momentum mentioned briefly above. In this model, the parallel momentum of depositing species results in a preferred surface diffusion of atoms in a direction parallel to the sample surface and within the plane of incidence. This preferred surface diffusion causes the columns to tilt away from the vapor beam towards the substrate normal, as shown in FIG. 4. Based on this model, the alignment layer was designed to use an ion beam assist during oblique evaporation to transfer an opposing parallel momentum to depositing atoms, as shown in FIG. 7. Due to the orientation of the ion gun, the momentum transferred by the ion beam is in the opposite direction as the deposition parallel momentum, which minimizes (or reverses) the effect. Atoms are given a preferential surface diffusion in the opposite direction which leads to: (a) a reduction in column angle, $\alpha$ (FIG. 6) as compared to $\alpha'$ (FIG. 3); (b) densification of the deposited column 17', and (c) and planarization of the surface, i.e., planarization of the distal ends 20' of the columns 17; (FIGS. 6 and 7). At higher ion beam energies, surface sputtering occurs which assists in planarizing the sample surface.

A designed experiment was used to fully characterize the alignment layers, the results of which provide a comprehensive model of tilt bias (for sample E46) as a function of ion beam current, ion beam energy, and deposition rate. The experiment used a central composite rotatable design requiring 15 experimental points and 6 reproductions of the center point (to obtain an estimate of variance) for a total of 20 trials. A phase retarder (i.e., liquid crystal cell) was fabricated for each trial and a witness sample (indicative of the phase retarder's alignment layers) was included in each alignment layer deposition. Prior to depositing the films, a short ion bean sputter cleaning of the substrate surface was used to remove residual contaminants and promote good adhesion. In this work, the ion cleaning process was performed using a 20 mA, 300 eV Ar ion beam for ion gun 106 at the +65 degree angle for a duration of 2 minutes. The alignment layer depositions were performed with both the electron beam source, and ion gun operating simultaneously throughout the deposition. The SiO deposition rate from source 108 was varied from 1.0 to 3.0 Angstroms/min. The E-beam source 108 was here an MKS 4000 series source and was located approximately 1.3 meters from the sample to yield a highly uniform deposition. The ion gun 106, here a 3 cm Ion Tech gun equipped with a plasma bridge neutralizer, was run with beam currents of 10 to 40 mA, beam energies of 75 to 225 eV and accelerator voltage of 700 eV. Due to vacuum system constraints, the ion gun 106 was located close (~10 cm) to the substrates. The gases used in the ion gun 106 were Ar (at 3 sccm) and $O_2$ (at 1.5 sccm). The oxygen was added to minimize effects of residual $0_2$ in the vacuum system. The addition of $0_2$ changes the composition of the SiO to $SiO_x$, which provides control over the film properties.

TABLE 1

Design Matrix for Experiment

| Trial | beam Current (mA) | beam Energy (eV) | dep. Rate A/sec | fabrication order | tilt bias (deg.) | cell thickness ($\mu$m) | phase retarder designation |
|---|---|---|---|---|---|---|---|
| $1^2$ | 16 | 105 | 1.4 | 15 | 9.0 | 14.55 | PR54_98 |
| $2^1$ | 34 | 105 | 1.4 | 10 | —<br>3.0 | 14.22 | PR49_98 |
| 3 | 16 | 194 | 1.4 | 5 | 7.5 | 14.38 | PR43_98 |

TABLE 1-continued

Design Matrix for Experiment

| Trial | beam Current (mA) | beam Energy (eV) | dep. Rate A/sec | fabrication order | tilt bias (deg.) | cell thickness (μm) | phase retarder designation |
|---|---|---|---|---|---|---|---|
| 4[1,2] | 34 | 194 | 1.4 | 14 | — 34 | 14.34 | PR53_98 |
| 5 | 16 | 105 | 2.6 | 19 | 11 | 14.42 | PR59_98 |
| 6[2] | 34 | 105 | 2.6 | 7 | 3.5 | 14.34 | PR45_98 |
| 7[2] | 16 | 194 | 2.6 | 13 | 11 | 14.68 | PR52_98 |
| 8[1,2] | 34 | 194 | 2.6 | 6 | — 9.5 | 14.23 | PR47_98 |
| 9 | 10 | 150 | 2.0 | 9 | 13 | 14.51 | PR48_98 |
| 10[1] | 40 | 150 | 2.0 | 17 | −4 | 14.18 | PR56_98 |
| 11 | 25 | 75 | 2.0 | 3 | 17 | 14.70 | PR44_98 |
| 12[1] | 25 | 225 | 2.0 | 18 | — 23.5 | 14.13 | PR57_98 |
| 13[1] | 25 | 150 | 1.0 | 11 | — 9.5 | 13.84 | PR50_98 |
| 14 | 25 | 150 | 3.0 | 2 | 7 | 14.45 | PR40_98 |
| 15 | 25 | 150 | 2.0 | 1 | 7 | 14.55 | PR39_98 |
| 16[3] | 25 | 150 | 2.0 | 4 | 1 | *** | PR42_98 |
| 17 | 25 | 150 | 2.0 | 8 | −3 | 14.23 | PR46_98 |
| 18 | 25 | 150 | 2.0 | 12 | 0.5 | 14.39 | PR51_98 |
| 19[2] | 25 | 150 | 2.0 | 16 | 1 | 14.28 | PR55_98 |
| 20 | 25 | 150 | 2.0 | 20 | −3 | 14.24 | PR60_98 |

[1]Samples exhibited unstable TB
[2]Samples selected for SEM analysis
[3]Thickness data lost At least two tilt bias (TB) measurements were taken from each phase retarder and the averages from the measurements were used in a regression analysis to generate polynomials describing TB as a function of deposition parameters. Witness samples (corresponding to phase retarders with a wide range of tilt biases) were selected from six of the 15 trials for analysis by SEM. The gap thickness was measured on all phase retarders (by measuring FabryPerot fringes in a spectrophotometer) prior to filling with liquid crystal. Table 1 below shows the deposition parameters, fabrication order, TB, thickness and phase retarder designation for all the trials in the matrix.

The following $2^{nd}$ order polynomial, describing TB as a function of ion beam current, ion beam energy, and deposition rate, was obtained from the regression analysis of the TB data:

$$TB = 36.5 - 19.3C - 0.014AB + O.596AC + O.082BC, \quad \text{equation (1)}$$

where A is beam current (mA), B is beam energy (ev) and C is deposition rate (angstroms/sec). Note that C was measured with a crystal monitor normal to the evaporation source and shaded from the ion beam. All first order, second order, and bilinear (interaction) terms were evaluated and any coefficients with <90% confidence were eliminated. The polynomial consists mainly of interaction terms indicating strong interactions between the process variables. It should be noted that TB is high when either beam current, energy, or both are low. As beam current and energy are increased the tilt bias decreases to zero, then changes sign and becomes increasingly negative. It should also be noted that increasing the deposition rate results in a modest increase in tilt bias.

High positive tilt bias samples were found to have a well-defined columnar structure generating a coarse, porous surface. These are the only samples for which the column tilt angle can be accurately measured in cross sectional SEM micrographs, yielding angles of +49 degrees and +57 degrees (with respect to the substrate normal). Note that these samples correspond to a relatively low beam current. For higher beam currents and energies, reduced thickness and densification of the films make it difficult to obtain high-resolution images of the column structures. Where the beam current is increasing, but the beam energy is still moderate, the film thickness decreases. This is consistent with the expectations that higher ion flux densities would result in a greater amount of sputtering.

The data show how surface modifications induced by the ion beam give rise to the ability to control TB over the wide range observed in the experiment. Mechanical alignment mechanisms are believed to dominate throughout, but the range of TB can be divided into three distinct regions. First, for low beam current and energies, the ability to decrease $SiO_x$ column tilt angle with the ion assist yields the ability to tune TB over high positive angles. The alignment of nematic liquid crystals to columnar $SiO_x$ films has been reported by many authors. For a clean $SiO_x$ surface, liquid crystals align homogeneously and the direction of the director is determined by minimization of elastic strain energy. In the second region, alignment over small tilt bias angles results from a reduction in column angle accompanied by planarization of the surface. It is this region which is of greatest interest since low tilt bias angles are desirable for high dynamic range devices. In the third region (for high beam current and energies), roughening by ion milling results in negative TB angles. While alignment to ion milled surfaces has been demonstrated, it is of less interest due to weaker alignment and greater process variation. The transformation through the three regions is continuous and can be controlled with excellent precision (especially over positive angle) by adjusting the deposition parameters.

As demonstrated earlier, an ion assist with a modest beam current and energy dramatically increases the column tilt angle, but has only a modest effect on surface planarization. Elastic strain modeling was again used to determine the director orientations for nematic liquid crystals in contact with these layer 17' (here deposited using a modest ion beam assist consisting of ion assist current of 16 mA, an ion beam energy level of 105 eV and an $SiO_x$ deposition rate of 1.4 Angstroms per second) shown in FIG. 6. Experimentally these films were found to result in a tilt bias α' of 9 degrees (for the liquid crystal E46) which agrees well with the model indicating ~8 degrees. The modeling for films with both modest and no ion assist indicate that the tilt bias in the bulk is predominately determined by columnar tilt angle, but that perturbations around the column tip also contribute to the tilt bias. These models also show that the reduction in column angle reduces tilt bias, but that low tilt bias cannot be achieved by reduction in column angle alone.

Figure 8:
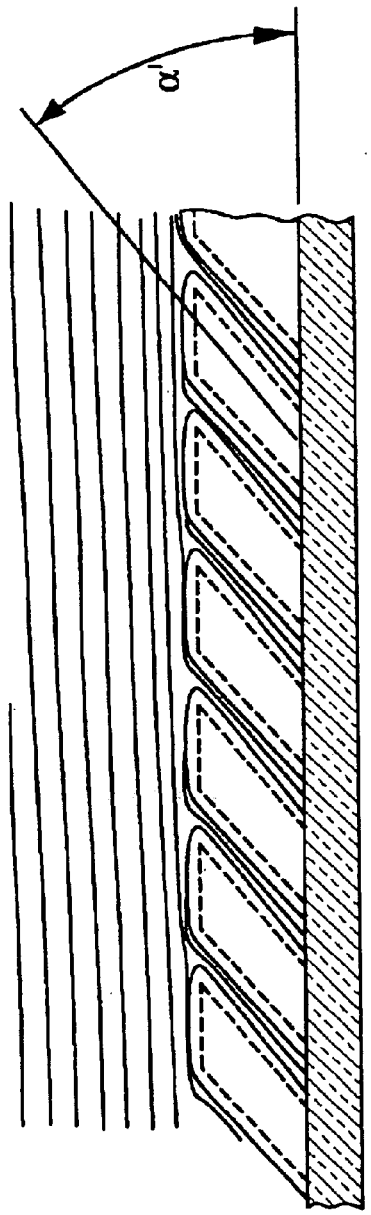
FIG. 8 is a sketch of a portion of a substrate structure of a liquid crystal cell, such sketch showing columns of director alignment material on the substrate structure of FIG. 6 according to another embodiment of the invention.

Analysis of low tilt bias films (0–10 degrees) indicate that planarization of the films, which alters the geometry of the column tips, is required to obtain low tilt bias. Films with low column angles and better planarity are obtained using higher ion assist energies and beam currents. Also note the reduction in void fraction (smaller spacing between columns). Modeling of the director angles for these films indicates that a low tilt bias is obtained as a result of strong parallel alignment along the tops of the columns with the periodic voids between columns yielding a slight tilt bias, as shown in FIG. 8. Here, in FIG. 8, is illustrated a case where the director reaches a tilt bias α' of two degrees under a condition of an ion assist current of 34 mA, an ion beam energy level of 105 eV and an $SiO_x$ deposition rate of 2.6 Angstroms per second. This represents a significant difference from non-ion assisted columnar films where the dominant contributions to the bulk tilt bias arise from column angle, not the geometry of the column tip.

Finally, increasing beam current and energy further still will eventually lead to an ion milling rate which exceeds the SiO deposition rate. In this regime, there is no accumulation of $SiO_x$ on the sample, and instead the surface is roughened by shallow angle ion milling. In this case, the tilt bias is reversed, or negative if the sign convention developed above is maintained (the director points in the opposite direction, away from the SiOx source). While potentially useful, the ion milled surfaces exhibit inferior stability than the oblique ion beam assisted evaporation (OIBAE) films making them less desirable for high performance devices.

A number of embodiments of the invention have been described. Nevertheless, it will be understood that various modifications may be made without departing from the spirit and scope of the invention. Accordingly, other embodiments are within the scope of the following claims.

What is claimed is:

1. A liquid crystal cell, comprising:

a first substrate;

a plurality of parallel columns of director alignment material disposed on a surface of the first substrate, each one of the columns having a longitudinal axis disposed at an oblique angle with respect the surface of the first substrate, each one of the columns terminating in a distal end having a surface substantially flat and substantially parallel to the surface of the first substrate;

a second substrate; and a liquid crystal material disposed between the surfaces of the first and second substrates with portions of such liquid crystal material being in contact with the parallel columns of director alignment material.

2. A liquid crystal substrate structure, comprising:

a substrate;

a plurality of parallel columns of director alignment material disposed on a surface of the substrate, each one of the columns having a longitudinal axis disposed at an oblique angle with respect the surface of the substrate, each one of the columns terminating in a distal end having a surface substantially flat and substantially parallel to the surface of the substrate.

* * * * *

UNITED STATES PATENT AND TRADEMARK OFFICE
CERTIFICATE OF CORRECTION

| | | |
|---|---|---|
| PATENT NO. | : 6,867,837 B2 | |
| APPLICATION NO. | : 09/769166 | |
| DATED | : March 15, 2005 | |
| INVENTOR(S) | : John Fijol | |

It is certified that error appears in the above-identified patent and that said Letters Patent is hereby corrected as shown below:

<u>Title page,</u>
Item [57], ABSTRACT,
Line 5, delete "respect the surface" and replace with -- respect to the surface --.

<u>Column 2,</u>
Line 30, delete "low lilt" and replace with -- low tilt --.

<u>Column 3,</u>
Lines 14 and 30, delete "respect the surface" and replace with -- respect to the surface --.

<u>Column 4,</u>
Line 3, delete "the an ion gun" and replace with -- the ion gun --.
Line 17, delete "pre tilt" and replace with -- pre-tilt --.
Line 42, delete "PRIOR ART" and replace with -- PRIOR ART; --.
Line 53, delete "invention" and replace with -- invention; --.
Line 57, delete "invention." and replace with -- invention; --.

<u>Column 5,</u>
Line 39, delete "compunds" and replace with -- compounds --.

<u>Column 6,</u>
Line 14, delete "α (FIG.6) as compared to α" and replace with
-- α' (FIG.6) as compared to α --.

<u>Column 8,</u>
Lines 60-61, delete "positive angle" and replace with -- positive angles --.
Line 67, delete "with these layer 17'" and replace with -- with layer 17' --.

UNITED STATES PATENT AND TRADEMARK OFFICE
CERTIFICATE OF CORRECTION

PATENT NO. : 6,867,837 B2
APPLICATION NO. : 09/769166
DATED : March 15, 2005
INVENTOR(S) : John Fijol It is certified that error appears in the above-identified patent and that said Letters Patent is hereby corrected as shown below:

Column 10,
Lines 16 and 30, delete "respect the surface" and replace with -- respect to the surface --.

Signed and Sealed this

Eleventh Day of July, 2006

JON W. DUDAS
*Director of the United States Patent and Trademark Office*